United States Patent [19]

Hermann

[11] Patent Number: 4,632,297
[45] Date of Patent: Dec. 30, 1986

[54] METHOD AND APPARATUS FOR FEEDING SHAPE-WELDED WORKPIECES IMMEDIATELY AFTER FORMATION

[75] Inventor: Bodo Hermann, Bottrop, Fed. Rep. of Germany

[73] Assignee: M.A.N. Maschinenfabrik Augsburg-Nürnberg AG, Fed. Rep. of Germany

[21] Appl. No.: 739,608

[22] Filed: May 30, 1985

[30] Foreign Application Priority Data

Jun. 1, 1984 [DE] Fed. Rep. of Germany ....... 3420376

[51] Int. Cl.⁴ ............................................. B23K 9/04
[52] U.S. Cl. ................................. 228/222; 164/486; 266/46
[58] Field of Search ............... 228/200, 222; 164/444, 164/486; 266/46

[56] References Cited

U.S. PATENT DOCUMENTS

| | | | |
|---|---|---|---|
| 1,969,840 | 8/1934 | Goddard | 228/222 |
| 3,653,425 | 4/1972 | Elliot et al. | |
| 4,103,138 | 7/1978 | Moriki | 228/222 X |
| 4,222,431 | 9/1980 | Bryson | 164/486 X |
| 4,541,473 | 9/1985 | Onoe et al. | 164/444 |

FOREIGN PATENT DOCUMENTS 480512 12/1975 U.S.S.R. .............................. 228/200

*Primary Examiner*—Kenneth J. Ramsey
*Attorney, Agent, or Firm*—McGlew and Tuttle

[57] ABSTRACT

Workpieces which are formed by the build-up of weld metal are treated and cooled by directing a fluid such as water in a large stream so that rapid and intensive cooling of the surfaces of the workpiece is achieved by creating a laminar water flow. A water quantity is directed to reach the workpiece surface in a laminar flow and it is permitted to flow over the workpiece as the water is sucked off before it reaches its boiling point at the rate of flow to the workpiece and away from the workpiece being sufficient to prevent the formation of steam. The water which is employed is advantageously recooled to its initial temperature by the withdrawing effect created by an air fan.

5 Claims, 3 Drawing Figures

METHOD AND APPARATUS FOR FEEDING SHAPE-WELDED WORKPIECES IMMEDIATELY AFTER FORMATION

FIELD AND BACKGROUND OF THE INVENTION

This invention relates in general to the formation of structures by build-up welding and in particular to a new and useful method and apparatus for treating the welded structure as it is formed.

The invention relates to a process for locally cooling the surfaces of shape-welded workpieces before and/or after the weld location, using a water/air mixture.

In shape-welding of workpieces from certain metals, e.g. austenitic steels or low-alloy quenched and tempered steels, the temperature of the workpiece is kept below a certain critical level in order to obtain the desired quality grades. For this reason a part of the heat of the welding zone is often removed by cooling the workpiece behind and/or before the weld location.

In such cases cooling water is mostly sprayed under pressure on the workpiece and the steam generated is exhausted.

A known cooling device (German AS No. 29 42 868) of this type consists of a nozzle arranged in a guide funnel and trained on the workpiece, as well as a hood encircling the guide funnel and connected to an exhaust unit. As steam generated during the workpiece cooling is deleterious to welding processes, it must be removed thoroughly from the workpiece. This requires the use of a cooling device comprising elaborate and expensive equipment.

SUMMARY OF THE INVENTION

The invention provides a method for local cooling of shape-welded workpieces such that a rapid and intensive cooling of their surfaces is achieved without encountering any of the disadvantages mentioned above.

In quenching and tempering of rolled sheets with water, it is common knowledge that use of laminar-flow brings about an intense cooling effect.

This very fact is made use of in achieving the objective of this invention in the following manner:

The water quantity reaching the workpiece surface in a laminar flow and flowing on the workpiece is sucked off before reaching the boiling point with a quantity of air sufficient to prevent formation of steam and further characterized in that the drawnoff water is recooled to its initial temperature by means of the air.

The application of laminar-flow cooling water together with a sufficiently large volume of air for the extraction brings about an optimal local cooling of the workpiece surface. In this case the cooling water is evenly distributed over a wide area as against the water spray used in the known cooling processes where mainly a turbulent water flow is encountered. As a result there is no formation of undesirable steam in the process invented which makes use of the required volume of air for water extraction. Water which gets warmed up while cooling the workpiece surface is again cooled by the air used for its extraction and can therefore be recycled in the process.

A device used for the implementation of the subject process comprises the well-known injector designed as a venturi pipe. In tests carried out with this injector where the latter was fitted for training at the workpiece at any desired angle, it was possible to achieve an optimal cooling of the workpiece as well as that of the cooling water extracted according to the cooling process invented.

The water supply and the extraction air volume can be adjusted to suitably match the travel of the workpiece.

If, for example, the workpiece is moving very slowly, then an acute angle of impact can be chosen for the device for the water supply and air extraction. If the workpiece moves faster, more obtuse angles are chosen to enable distribution of the cooling water over as wide workpiece area as possible.

Accordingly it is an object of the invention to provide an improved method of treating a build-up welded workpiece which comprises directing a liquid such as water onto the workpiece in a rapid laminar flow and withdrawing the liquid from the workpiece before the liquid boils using an air or similar gas stream to effect its fast withdrawal.

A further object of the invention is to provide an apparatus for treating articles which would have been built up of weld metal which comprises immediately after the formation thereof directing a liquid in a form of a large laminar flow over the workpiece while withdrawing the liquid at a rapid rate to ensure that no steam is formed.

A further object of the invention is to provide an apparatus for effecting the cooling of a welded workpiece which comprises directing a laminar flow of liquid against the workpiece at a selected angle so as to maintain a continuous laminar flow stream over the workpiece and withdrawing the laminar flow of liquid at a rate sufficient to cause it to be cooled rapidly without the formation of steam.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which preferred embodiments of the invention are illustrated.

DESCRIPTION OF THE PREFERRED EMBODIMENTS

Figure 1:
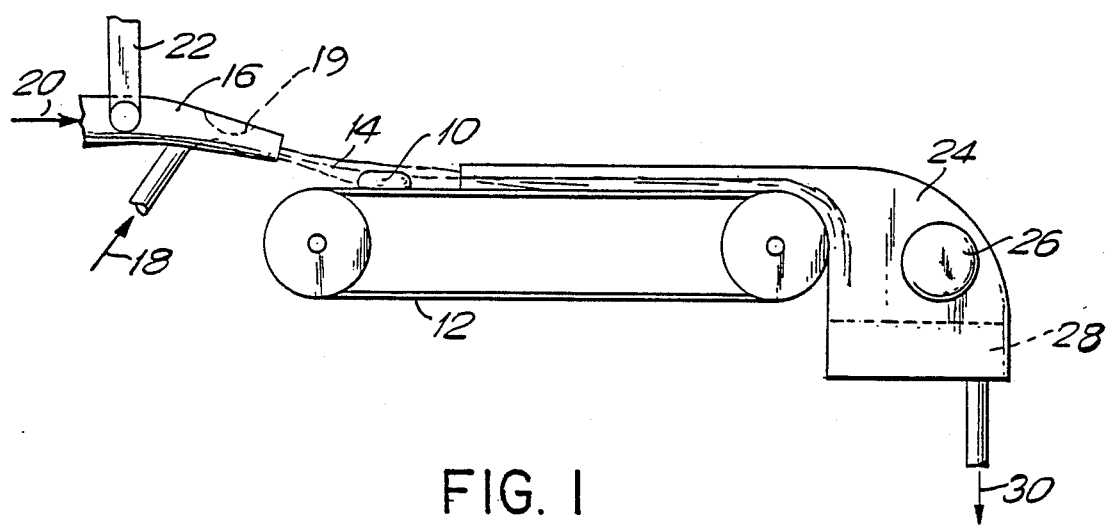
FIG. 1 is a schematic representation of an apparatus for effecting the rapid cooling of a build-up workpiece in accordance with the invention.

Referring to the drawings in particular, the invention embodied therein comprises a method of treating a workpiece 10 which is formed by the buildup of weld metal immediately after it is formed by directing it onto a support such as an endless conveyor 12 over which a laminar flow of liquid such as water 14 is directed. The water 14 is directed advantageously from an injector 16 which is advantageously operated by a fluid or gas 18 which is directed into a nozzle injector 16 to produce laminar flow of a liquid such as water which enters in the direction of the arrow 20. The gas and water is supplied upstream of a venturi 19 shown in FIG. 1, with respect to the workpiece 10.

Injector 16 is pivoted on a support 22 so that it may be directed at a selected angle against the workpiece 10 sufficient to produce a laminar liquid flow thereover. In accordance with the invention, means such as a fan withdrawal device 24 is arranged to remove the water before it forms steam and it may be operated by a fan such as an air withdrawal fan 26 which also acts to cool the water as it is directed off the workpiece into a reservoir 28 for removal through a conduit 30.

Advantageously in accordance with the invention the process for the local cooling of shape-welded workpieces 10 before or after the weld location is accomplished by means of a water-air mixture 14 directed in a quantity such that the water reaches the workpiece in a surface in a laminar flow. In addition, the water which flows over the workpiece is sucked off before reaching the boiling point with a quantity of air produced by the fan 26 sufficient to prevent the formation of steam. The drawn off water is recooled to its initial temperature by means of the air which is circulated.

Figure 2:
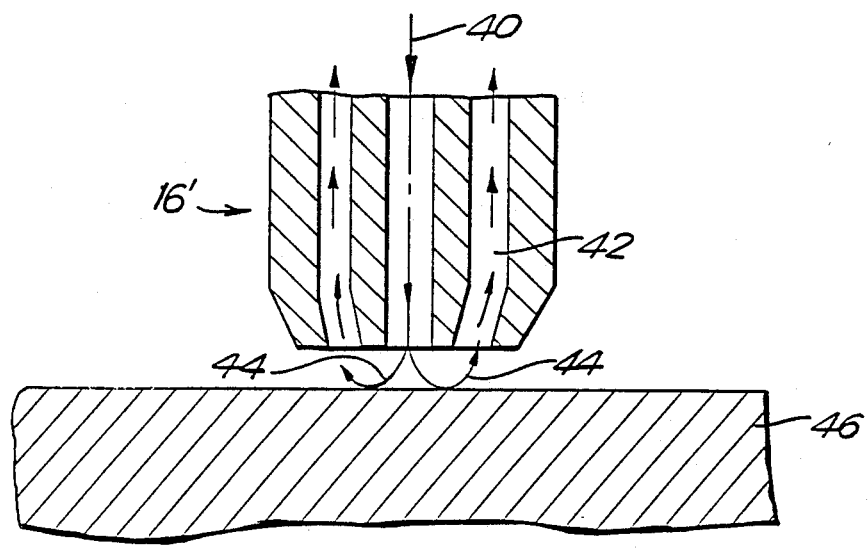
FIG. 2 is an enlarged schematic sectional view of another embodiment of the nozzle.

FIG. 2 shows a nozzle 16' in which the water is directed in a central stream as shown by arrow 40 and a suction is applied in an annular passage 42 to withdraw water as indicated by arrows 44. An upper surface of the workpiece is shown at 46.

Figure 3:
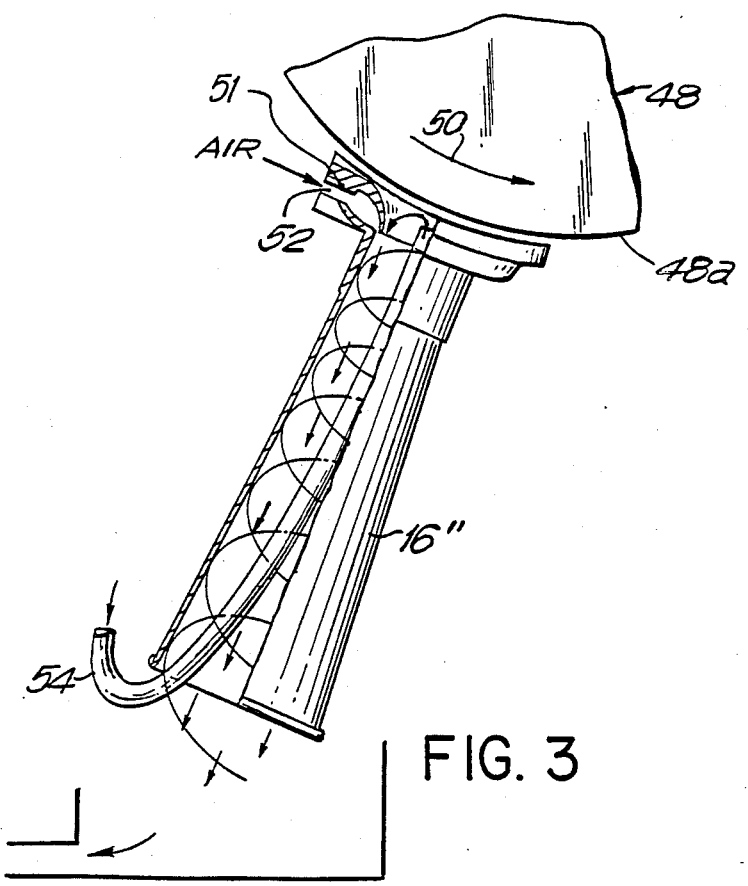
FIG. 3 is a view similar to FIG. 1 of another embodiment of the invention.

In FIG. 3 a workpiece 48 is rotated in the direction of arrow 50. Air is directed into a passage 52 of a venturi ring 51 of nozzle 16" and water is admitted through a tube 54 and is deflected by the surface 48a backwardly through the nozzle by the vacuum produced by the air from passage 52.

While specific embodiments of the invention have been shown and described in detail to illustrate the application of the principles of the invention, it will be understood that the invention may be embodied otherwise without departing from such principles.

What is claimed is:

1. A process for cooling the surface of a workpiece which is built up by welding, comprising: directing an air and water mixture stream against the surface of the workpiece such that a laminar flow of air and water is achieved over the surface; and sucking off the water from the surface before it reaches its boiling point using an air flow rate sufficient to prevent the formation of steam at the surface of the workpiece.

2. A process according to claim 1, including directing the water through a tube against a location on the surface of the workpiece, surrounding the location on the workpiece with a venturi ring for directing air away from the location and supplying air at the air flow rate which is sufficient to prevent the formation of steam through the venturi ring to draw water away from the location of the workpiece.

3. A process according to claim 2, including receiving the air from the venturi ring which is being directed away from the location on the workpiece, in a nozzle for directing the air and the water away from the workpiece, the tube for carrying the water being disposed in the nozzle, and directing the water through the tube and through the nozzle against the location on the workpiece.

4. A process according to claim 1, including directing the water in a central steam toward a location on the surface of the workpiece, surrounding the location with an annular passage and drawing air at the air flow rate which is sufficient to prevent the formation of steam through the annular passage away from the location on the workpiece.

5. A process according to claim 1, including carrying the workpiece on a moving conveyor, directing water and air into a venturi nozzle aimed at the conveyor for directing the air and water mixture stream against the surface of the workpiece, and drawing water from the air and wate mixture stream off the conveyor using a fan for generating the air flow rate which is disposed on a side of the workpiece opposite from the nozzle.

* * * * *